United States Patent [19]
Weddendorf

[11] 3,841,440
[45] Oct. 15, 1974

[54] SAFETY DOOR MECHANISM
[75] Inventor: Elmer R. Weddendorf, Cincinnati, Ohio
[73] Assignee: B/W Metals Company, Inc., Fairfield, Ohio
[22] Filed: June 1, 1973
[21] Appl. No.: 365,980

[52] U.S. Cl. .............................................. 186/1 R
[51] Int. Cl. .............................................. E04h 3/04
[58] Field of Search ........ 214/16.1 A; 186/1 R, 1 D, 186/1 B, 1 A; 198/209

[56] References Cited
UNITED STATES PATENTS
| | | | |
|---|---|---|---|
| 1,949,468 | 3/1934 | Hackett | 186/1 R |
| 2,644,567 | 7/1953 | Springer | 186/1 R X |
| 3,391,758 | 7/1968 | Kinkaid et al | 186/1 R |

*Primary Examiner*—Frank E. Werner
*Attorney, Agent, or Firm*—Wood, Herron & Evans

[57] ABSTRACT

A safety door mechanism for a rotating cafeteria style food service counter, the counter top being doughnut-shaped and defining a center area accessible only through a tunnel beneath the counter top. A first switch is provided for the tunnel's outer door and a second switch is provided for the tunnel's inner door, the switches being spring loaded open and being in parallel with the counter top's drive motor circuit such that opening of either door breaks that circuit, thereby causing rotation of the counter top to cease when either door is open. Thus, ingress to and egress from the center area defined by the counter top can be accomplished through the access tunnel beneath the counter top only after the counter's drive motor circuit has been interrupted.

3 Claims, 6 Drawing Figures

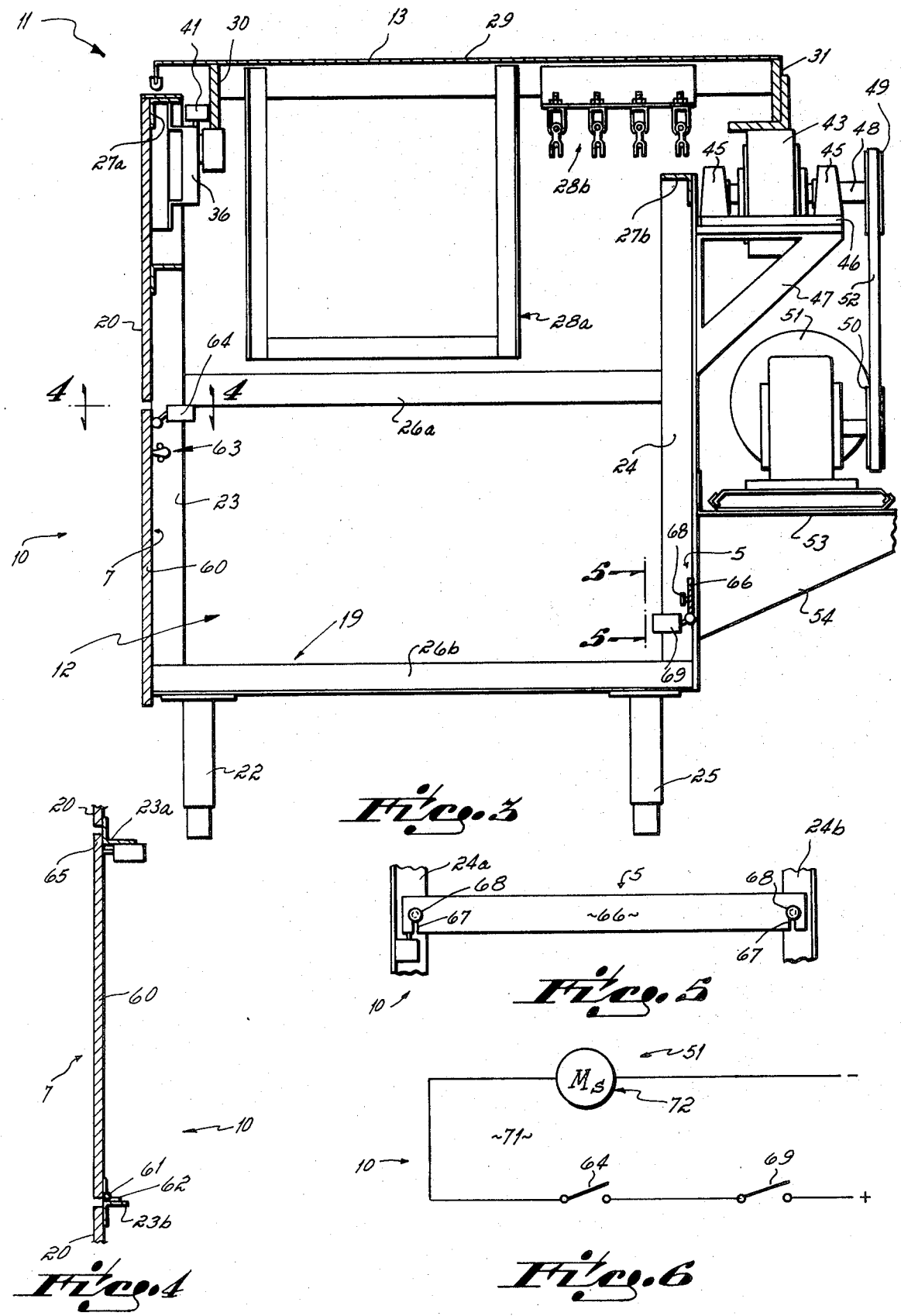

SAFETY DOOR MECHANISM

This invention relates to food service counters. More particularly, this invention relates to a safety door mechanism for a food service counter of the rotating cafeteria type.

Over the years the cafeteria style of serving food has been one of the mainstays of the food service industry. This particular style of distributing food to the consumer has been found particularly effective in connection with institutional type feeding such as commonly is found in schools, hospitals and the like. The cafeteria type food service facility is also quite popular with large corporations in connection with the feeding of employees at lunchtime. Of course, the cafeteria style food distribution system has also been used over many years in retail restaurant installations. All such food service facilities are commonly known as cafeterias.

Historically, the food service counters in cafeteria style food service operations have been substantially planar, i.e., the counter has been of a flat, table-like configuration. Prepared food of each individual food dish is placed on the counter in dish rows extending from the front edge to the rear edge of the counter, the dishes of food in each row being the same, e.g., the same salad or same dessert or the like. The customer's tray is supported on a tray support that is fixed to the counter along the front edge thereof, and extends outwardly therefrom. In use, a customer walks from one end of the food service counter to the other, making periodic selections of different food dishes along the way. Thus, as the customer moves from one end of the counter to the other he pushes the tray on the tray support in front of him, periodically makes food selections from the counter top, and places those selections on his tray.

In recent years there has been developed a new type cafeteria counter top that is configured in the shape of a doughnut. The doughnut-shaped counter top rotates about a center axis at a relatively slow rate. The counter top rotates between a kitchen or food supply area and a customer service area, the kitchen and customer service areas being separated one from the other by a wall or other suitable divider. The counter's food supply is replenished by employees within the kitchen area, and the dished food is selected and removed from the counter top by customers standing within the customer service area. A series of tray supports are disposed about the circular outer periphery of the rotating counter top in the customer service area. The tray supports are stationary and are fixed to a stationary exterior wall within which the counter top rotates, thereby defining fixed stalls within which the customers stand as the food counter top (with dished food thereon rotates past each stall for selection or rejection by the customer within the stall.

The rotating cafeteria food service counter is becoming popular particularly with institutional and in-plant type facilities. The rotating style food service type counter does not require the customer to walk the length of the counter available for customer service. On the contrary, the customer stands completely still while the food dishes move to the customer in sight and within easy reach. It has been found that the method of serving food by a rotating food service counter provides fast service, requires less customer service area, reduces mechanical installation costs, and provides an efficient use of labor relative to the historical cafeteria style food service counter in which the customer walked from one end of the counter to the other. A particular embodiment of a rotating cafeteria style counter, although slightly differing in structural detail from the one described herein, is particularly illustrated in U.S. Pat. No. 3,339,718.

However, and in connection with the rotating cafeteria style food service counter, it is important that access be provided between the exterior of the counter and that interior or center area defined by the doughnut-shaped counter top. In the kitchen service area of the counter, it is oftentimes desirable for kitchen help to stand in the inner or center area of the counter to resupply the rotating counter top with food dishes to be sold to customers. Further, and importantly, it is necessary that maintenance men or mechanics have access to the interior area of the counter for the purpose of maintaining and/or repairing the counter's drive mechanism or the like. Since the rotating counter top is disposed above floor level, a maintenance man or kitchen helper may attempt to crawl beneath the counter top into the interior or center area defined by the doughnut-shaped counter top when access to that center area is desired.

However, the rotating counter top may well carry a series of one or more compressors on its underside for cooling units incorporated into the counter top, as well as electrical conductors on its underside for supplying electric power to those compressors as well as to heat lamps which may be mounted above the counter top. This electrical/mechanical equipment, being fixed to the counter's underside, rotates with the counter top. Hence, any mechanic or kitchen helper or the like attempting to crawl underneath the counter top while the counter top is rotating would be subjected to the hazard of being contacted by the equipment and/or other structure fixed to the underside of the counter.

Therefore, it has been an objective of this invention to provide a safety door mechanism incorporated with a tunnel defined in frame structure adapted to support a rotating cafeteria style food service counter, that safety door mechanism preventing ingress to and egress from the doughnut-shaped counter's interior or center area unless the rotating counter top has been stopped.

In this connection, the safety door mechanism of this invention is provided for a rotating cafeteria style food service counter, the counter top being doughnut-shaped and defining a center area accessible only through a tunnel beneath the counter top. A first switch is provided for the tunnel's outer door and a second switch is provided for the tunnel's inner door, the switches being spring loaded open and being in parallel with the counter top's drive motor circuit such that opening of either door breaks that circuit, thereby causing rotation of the counter top to cease when either door is open. Thus, ingress to and egress from the center area defined by the counter top can be accomplished through the access tunnel beneath the counter top only after the counter's drive motor circuit has been interrupted.

Other objectives and advantages of this invention will be more apparent from the following detailed description taken in conjunction with the drawings in which:

FIG. 3 is a cross-sectional view taken along line 3—3 of FIG. 2 illustrating the safety door mechanism of this invention.

FIG. 4 is a cross-sectional view taken along line 4—4 of FIG. 3;

FIG. 5 is a cross-sectional view taken along line 5—5 of FIG. 3; and

FIG. 6 is a schematic diagram of the electric circuit for the counter's drive mechanism and incorporating the safety door mechanism of this invention.

The novel safety door mechanism 10 of this invention is incorporated with a rotating cafeteria style food service counter 11. The rotating style food service type counter 11 does not require a customer to walk the length of the counter available for customer service. Indeed, and on the contrary, the customer stands completely still while the food dishes on the counter top 13 moves to the customer in sight and within easy reach. A particular embodiment of a rotating cafeteria style food service counter 11, although slightly differing in structural detail from the one described herein, is particularly illustrated in U.S. Pat. No. 3,339,718. The disclosure of that patent is incorporated herein by reference.

Figure 1:
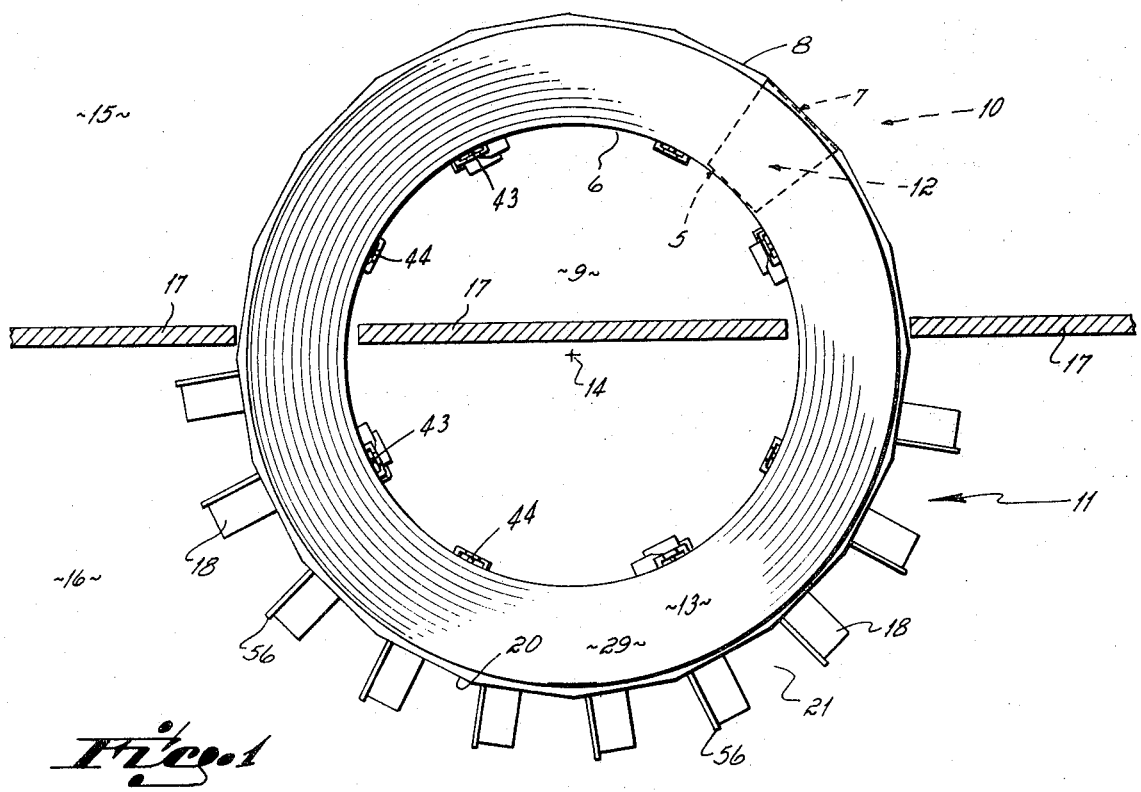
FIG. 1 is a top view illustrating a rotating cafeteria style food service counter.

As particularly illustrated in FIG. 1, the rotating cafeteria style food service counter 11 incorporates a horizontal, doughnut-shaped counter top 13 adapted to rotate about a center axis 14. The counter top 13 rotates between a kitchen or food supply area 15, and a customer service area 16. The kitchen 15 and customer service 16 areas are separated one from the other by a wall 17 or other suitable divider. The counter's food supply is replenished by employees within the kitchen area 15, and the dished food is selected and removed from the counter top 13 by customers standing within the customer service area 16. A tunnel 12 passes beneath the counter top 13 and connects the kitchen area 15 with the interior or center area 9 of the counter 11, the tunnel being provided with an outer door 7 on the counter's outer periphery 8 and an inner door or bar 5 on the counter's inner periphery 6.

A series of tray supports 18 are disposed about the circular outer periphery 8 of the rotating counter top 13 in the customer service area 16, see FIG. 1. The tray supports 18 are stationary, and are fixed to a stationary exterior wall 20 within which the counter top 13 rotates, thereby defining fixed stalls 21 within which the customers stand as the food counter top (with dished food thereon) rotates past each stall for selection or rejection by the customer within the stall. The exterior wall 20 extends completely around the outer periphery 8 of the counter 11, and extends from slightly above floor level to the level of the counter top 13, thereby precluding access to the counter's center area 9 by crawling beneath the counter top except through tunnel 12.

Figure 2:
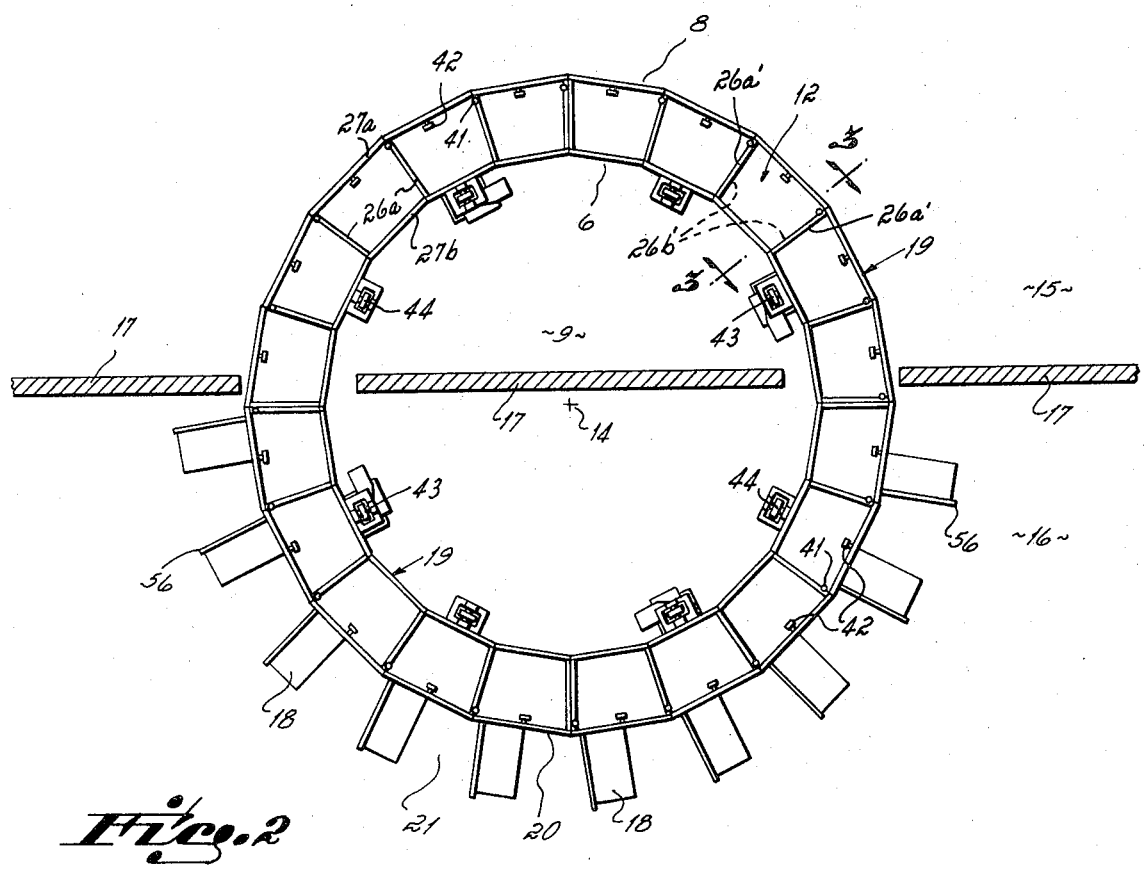
FIG. 2 is a view similar to FIG. 1 but showing the counter top removed, thereby exposing the counter's frame structure and drive mechanism.

More particularly, the rotating counter 13 includes a stationary frame 19 comprised of a series of vertical posts or uprights 23 (which define a circle) disposed about the circular outer periphery 8 of the counter top 13 and which terminate at their lower ends in legs or feet 22, and a series of vertical posts or uprights 24 (which define a circle) disposed adjacent the circular inner periphery 6 of the counter top 13 and also which terminate at their lower ends in legs or feet 25, see FIGS. 2 and 3. These posts 23, 24 are disposed in pairs, each pair being tied together by an upper cross member 26a and a lower cross member 26b. Further, successive outer posts 23 about the counter's outer periphery are tied together at their tops and bottoms by brace members 27a, and successive inner posts 24 about the counter's inner periphery are similarly tied together by brace members 27b. These members 26 and 27 integrate the posts 23, 24 into a complete structural frame 19 which supports the counter top 13. The outer wall or plate 20 is fixed to the exterior of the outer posts 23, thereby providing a closed frame 19 or base structure. The tunnel 12 beneath the counter top 13 is provided in the frame 19 and is defined by posts 23a, 23b, 24a, 24b, and cross members; 26a', 26b' with bottom brace members 27a, 27b being removed within the tunnel area.

The rotating counter top 13 includes a horizontally disposed doughnut-shaped table 29 having a circular front edge and a circular rear edge that substantially correspond, respectively, to outer 8 and inner 6 peripheries, see FIGS. 1 and 3. It is, or course, on the counter top that the dished food is placed for review and selection by the customer. The counter top 13 is supported by the frame 19, and is rotated by drive means fixed to the frame and described in detail below. The counter top 13 also includes a depending annular flange 30 adjacent to and concentric with the counter's outer periphery 8, and a depending annular L-shaped keel 31 adjacent to and concentric with the counter's inner periphery 6. Framework 28a, 28b is fixed to the table on the underside thereof, that framework thereby rotating with the counter top 13 as the counter top is rotated relative to the frame 19. The framework 28a may be used to carry compressors (not shown) for supplying refrigerant to coils (not shown) implanted in the counter top 13 for providing refrigeration to cold food dishes thereon. The framework 28b may be used to carry electric busbars or contact bars (not shown) for providing electric power to the compressors (not shown) and/or to heat lamps (not shown) mounted to the top surface of the counter top 13 for providing heat to hot food dishes thereon. It is this framework 28a, 28b which provides a potential hazard to kitchen help or mechanics or the like if the counter top 13 is rotating as those persons crawl through the tunnel 12 beneath the counter top 13 from the exterior of the counter 11 into the center area 9 of the counter and return.

The counter top 13 essentially rests on a series of vertically disposed idler wheels 42 located at spaced intervals about outer periphery 8, and a plurality of vertically disposed drive 43 and idler 44 wheels disposed about inner periphery 6, see FIGS. 2 and 3. The idler wheels 42 disposed about the counter's outer periphery 8 are simply wheels mounted in bearings 36, the bearings being fixed to the posts 23 of the counter's frame 19 by bolts (not shown). The counter top's annular flange 30 rests on the outer idler wheels 42. Further, the counter top 13 is maintained in coaxial relation with its axis of rotation 14 by horizontally disposed idler wheels 41 fixed to the frame 19. The horizontally disposed idler wheels 41 are carried in bearings 40 fixed to the frame 19, the horizontally disposed wheels being mounted alternately with the vertically disposed wheels 42. The horizontally disposed wheels 41 are mounted so as to bear against the outside face of the flange 30.

The drive wheel 43 mechanisms are also fixed to the counter's frame 19, each being fixed on an inner post 24 thereof. A series of four drive wheel 43 mechanisms are provided, these drive wheels being equally spaced about the counter's inner periphery. An idler wheel 44 (which is of generally the same construction, and is mounted in generally the same manner, as the drive wheels 43) is spaced between successive drive wheel 43. The idler wheels 44 are also mounted to inner posts 24 to provide adequate support for the counter top 13 on its inner periphery 6.

Each drive wheel 43 mechanism includes the drive wheel that is carried in bearings 45, the bearings being mounted on a plate 46 fixed to extend horizontally from an inner peripheral post 24 (the plate 46 is reinforced by gusset bar 47). The drive wheel's shaft 48 is provided with a pulley 49 on its inner end, the pulley being connected with pulley 50 of a drive motor 51 by belt 52. The motor 51 is mounted on a table 53 also fixed to the frame 19, that table 53 being reinforced by gusset plate 54. Since the L-shaped inner annular keel 41 is frictionally engaged with the drive wheels 43, rotation of the drive wheels at a controlled speed causes the counter top 13 to rotate at a controlled speed, too.

A series of tray supports 18 are disposed about the outer periphery 8 of the counter 11, and fixed to the counter's exterior wall 20 and frame 19, in the customer service area 16 of the counter. The tray supports 18 are simply horizontally disposed plates sized to receive a cafeteria tray (not shown) of a customer, each support being fixed to the counter's wall and frame by suitable brackets (not shown). A vertical stall wall 56 disposed radially relative to the counter is interconnected with each tray support 18 on one side thereof, and to the counter's peripheral wall 20. The tray supports 18, and vertical radially disposed stall walls 56 associated therewith, cooperate to define the series of stalls 21 disposed about the outer periphery 8 of the counter within the customer service area 16, each stall being sized to accommodate one customer at a time.

The safety door mechanism 10 of this invention is particularly illustrated in FIGS. 3–6. The function of the safety door mechanism 10 is to prevent ingress to and egress from the counter's center area 9 through the tunnel 12 while the counter top is rotating. To crawl underneath the rotating counter top 13 through the tunnel 12 defined in the stationary frame 19 supporting the counter top could be hazardous in light of the compressor frame 28a structure that extends down from and is mounted to the underside of the counter top, as well as in light of the electrical assemblage 28b fixed to the underside of the counter top. Thus, it is desirable not to crawl through the tunnel 12 unless the counter top 13 is stationary. The tunnel 12 may be positioned at any appropriate location about the counter's periphery, i.e., may be positioned in the customer service area 16 of the wall 20 or the kitchen area 15 of the wall 20, but preferably the tunnel is positioned in the kitchen area of the wall since that is the area from which maintenance mechanics or the like usually operate.

As shown in FIG. 3, the safety door mechanism 10 includes a door panel 60 for the tunnel's outer door 7 which, in effect, is a portion of, i.e., is cut out of, the counter's exterior wall 20. The outer door's panel 60 is mounted on a vertical hinge line 61 that incorporates hinges 62. The hinges 62 are mounted to a vertical post 23b of the counter top's support frame 19. The door panel 60 is held in the closed attitude by means of any typical latch assembly, a particular embodiment of which is shown as at 63 in FIG. 3. The door panel 60 is thereby adapted to swing about the vertical hinge line 61 between a closed attitude (see FIG. 4) where the door panel 60 is flush with the exterior wall 20 mounted on the support frame 19, and an open position (not shown) where same allows ingress to and egress from the counter's center area 9. The door panel 60 cooperates with a first switch 64 mounted to engage the free edge 65 thereof. The switch 64 is also fixed to a vertical post 23a. The switch is of the type that is spring loaded open so that the switch is opened to break the counter top's electric circuit when the door panel 60 is opened.

The tunnel's inner door 5 is defined by a bar 66 connected with successive inner posts 24a, 24b as shown in FIG. 5. The bar 66 is provided with a notch 67 at each end thereof, the notches being adapted to slip over bolts 68 fixed to the respective inner posts 24a, 24b. One end of the door bar 66 is adapted to cooperate with a second switch 69 fixed to one of the posts 24. This switch 69 is also spring loaded open such that, when the bar is not in contact therewith, i.e., when the inner door 5 is opened by removing the bar from studs 68, the switch will be opened so as to break the counter top's electric circuit.

A schematic electric circuit 71 incorporating the safety door mechanism 10 of this invention is illustrated in FIG. 6. As shown in FIG. 6, the drive motors 51 for the counter top 13 are illustrated as at 72. The two door switches, namely, the outer door switch 64 and the inner door switch 69, are incorporated in series with the motor drive circuit 61. This circuitry causes the rotating counter top 13 to stop its rotation if either the door bar 66 is removed from studs 68 or the door panel 60 is swung open. The outer door 7, in effect, prevents access to the tunnel 12 area underneath the counter top 13 from the outer periphery 8 thereof, and the inner door 5 prevents access to the tunnel 12 area underneath the counter top 13 from the interior or inner periphery 6 thereof, unless electric power to the rotating counter top 13 has been interrupted.

In use, and when it is desired that a maintenance mechanic or kitchen helper or the like proceed to the center area 9 of the rotating counter through the tunnel 12, the door panel 60 of the outer door 7 is first opened. This opens the electric power circuit 79 for the drive motors 51 since switch 64 is spring loaded open, thereby insuring that the rotating counter top 13 comes to a halt. The person then proceeds through the tunnel 12 from the outer periphery 8 of the counter 11 toward the inner periphery 5 of the counter and, upon reaching the inner periphery, moves the bar 66 off the inner posts 24, i.e., lifts the bar off studs 68, thereby causing switch 69 to open. Once the person passes into the inner area 9 defined by the doughnut-shaped counter top 13, the bar 66 is replaced to close the inner switch 69. In the meantime, the door panel 60 has been closed from the exterior by another person, thereby closing the outer switch 64. Thus, once again the motor circuit 71 is completed so as to allow the counter top 13 to rotate.

The bar 66 is first removed when it is desired to egress from the center area 9 of the counter 11, thereby opening the inner switch 69 which causes the counter top 13 to stop rotation. The person then proceeds part way through the ingress/egress tunnel 12 and then pushes open the door panel 60, thereby opening the outer switch 64. The door bar 66 is thereafter replaced in operational position on the inner posts 24, once again causing the second switch 69 to be closed; but the circuit 71 is still broken because the outer door's panel 60 is still open. Once the person emerges from the tunnel 12, the outer door's panel 60 is closed, thereby again completing the drive circuit 71 for the motors 51 and allowing the counter top 13 to commence rotation once again.

Having described in detail the preferred embodiment of my invention, what I desire to claim and protect by Letters Patent is:

1. A safety door mechanism for a rotating cafeteria style counter, that counter incorporating a counter top of generally circular configuration adapted to rotate on top a fixed frame, said safety door mechanism including a tunnel defined in said support frame structure, said tunnel being disposed beneath said counter top and providing ingress to and egress from the interior area of said counter, an outer door mounted to the outer periphery of said support frame, said outer door selectively closing and opening said tunnel as desired to access from the exterior of said counter, an inner door mounted to the inner periphery of said support frame, said inner door selectively closing and opening said tunnel as desired to access the interior of said counter, and a first switch and a second switch electrically connected in series with said counter top's drive means, said first switch being spring loaded open and mounted to said support frame in juxtaposition with said outer door, and said second switch being spring loaded open and mounted to said support frame in juxtaposition with said inner door, whereby opening of one or both of said outer and inner doors causes said counter top to stop rotation and closing of both said outer and inner doors allows said counter top to continue rotation.

2. A safety door mechanism as set forth in claim 1 including a first latch associated with said outer door and a second latch associated with said inner door, said latches serving to maintain said doors in closure relation with said tunnel.

3. A safety door mechanism as set forth in claim 1 including an exterior wall fixed to said counter's frame, said wall extending from substantially adjacent the counter top surface to the floor, and wherein said outer door includes a door panel which forms a part of said exterior wall.

* * * * *

UNITED STATES PATENT OFFICE
CERTIFICATE OF CORRECTION

Patent No. 3,841,440            Dated October 15, 1974

Inventor(s) Elmer R. Weddendorf

It is certified that error appears in the above-identified patent and that said Letters Patent are hereby corrected as shown below:

In the Specification:

Column 1 - Line 54 after "thereon" please insert -- ) --.

In the Claims

Claim 1

Column 8 - Line 4 after "access" please insert -- from --.

Signed and sealed this 31st day of December 1974.

(SEAL)
Attest:

McCOY M. GIBSON JR.           C. MARSHALL DANN
Attesting Officer             Commissioner of Patents